United States Patent
Francke et al.

(10) Patent No.: US 6,700,496 B2
(45) Date of Patent: Mar. 2, 2004

(54) FLAME AND SPARK DETECTOR, AUTOMATIC FIRE ALARM AND METHODS RELATED THERETO

(75) Inventors: Tom Francke, Sollentuna (SE); Vladimir Peskov, Stockholm (SE)

(73) Assignee: XCounter AB, Danderyd (SE)

( * ) Notice: Subject to any disclaimer, the term of this patent is extended or adjusted under 35 U.S.C. 154(b) by 190 days.

(21) Appl. No.: 09/899,938

(22) Filed: Jul. 9, 2001

(65) Prior Publication Data

US 2002/0089283 A1 Jul. 11, 2002

(30) Foreign Application Priority Data

Jan. 6, 2001 (SE) .............................. 0101864

(51) Int. Cl.⁷ .............................................. G08B 17/12
(52) U.S. Cl. .................... 340/578; 313/539; 250/372
(58) Field of Search .................. 340/578, 539, 340/522, 521; 313/539; 250/372, 554

(56) References Cited

U.S. PATENT DOCUMENTS

| | | | | |
|---|---|---|---|---|
| 3,656,019 A | * | 4/1972 | Stowe ........................ | 313/539 |
| 3,683,372 A | * | 8/1972 | Horn ......................... | 340/578 |
| 3,806,921 A | * | 4/1974 | Pappas ....................... | 340/578 |
| 4,578,583 A | | 3/1986 | Ciammaichella et al. ... | 250/372 |
| 4,581,536 A | * | 4/1986 | Groppetti et al. ........ | 250/385.1 |
| 4,876,443 A | | 10/1989 | Beucher .................. | 250/211 R |
| 4,931,688 A | * | 6/1990 | Tosswill .................. | 313/539 X |
| 5,349,194 A | | 9/1994 | Wuest et al. ............... | 250/372 |
| 5,500,531 A | | 3/1996 | Bu ............................. | 250/372 |
| 5,959,301 A | | 9/1999 | Warashina .................. | 250/372 |
| 5,982,094 A | | 11/1999 | Niigaki et al. ............. | 313/542 |
| 6,121,621 A | | 9/2000 | Warashina et al. ......... | 250/372 |

FOREIGN PATENT DOCUMENTS

DE    4125638 A1    2/1993

* cited by examiner

*Primary Examiner*—Thomas Mullen
(74) *Attorney, Agent, or Firm*—Birch, Stewart, Kolasch & Birch, LLP

(57) ABSTRACT

The present invention relates to a flame detector for detection of the presence of a flame or spark in front of the detector comprising a UV sensitive photocathode (12; 21) and an anode (14; 22), respectively, wherein the UV sensitive photocathode is oriented such that UV light from a flame present in front of the detector can strike the photocathode; a voltage supply unit (18; 23) connected to the UV sensitive photocathode and to the anode to force photoelectrons emitted from the UV sensitive photocathode when struck by UV light from a flame present in front of the detector to move towards the anode; and a readout arrangement (15–17; 24) adapted to detect charges induced by electrons moving towards the anode to thereby detect the presence of a flame in front of the detector. The flame detector can be combined with an alarm unit (33) to form an automatic alarm (31).

23 Claims, 2 Drawing Sheets

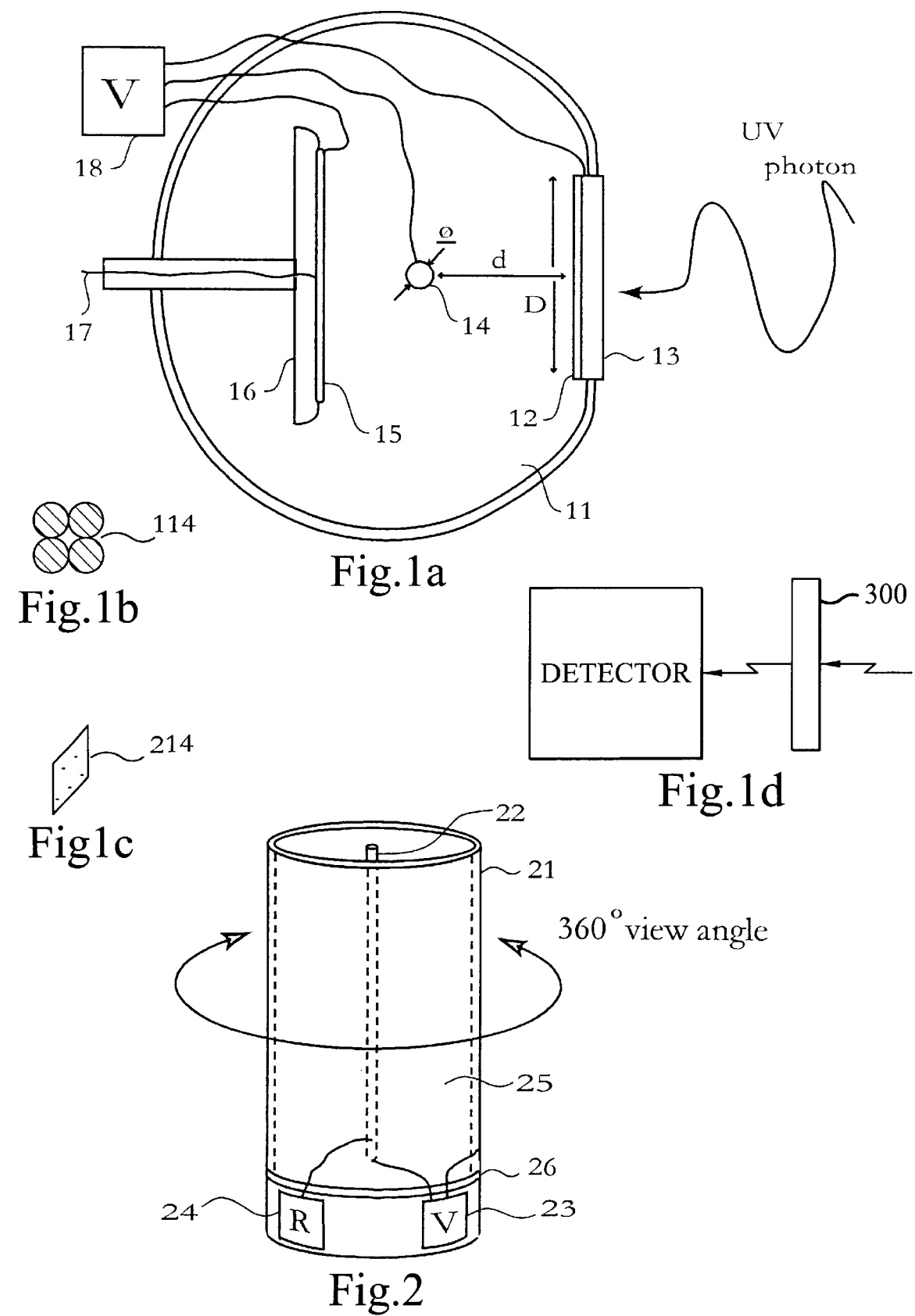

FLAME AND SPARK DETECTOR, AUTOMATIC FIRE ALARM AND METHODS RELATED THERETO

TECHNICAL FIELD OF THE INVENTION

The present invention generally relates to flame and spark detection, and is usable in a variety of fields including for instance fire alarming and flame monitoring of e.g. oil pipe flames and rocket launches, but also to detect electrical coronas, discharges, and to detect lightening at day time as a fast warning, or for triggering fast switch-off of equipment.

DESCRIPTION OF RELATED ART AND BACKGROUND OF THE INVENTION

Many simple automatic fire alarms of today are based on a smoke detector. However, in some situations a smoke detector alone does not give reliable information about fire related accidents. Thus, more sophisticated and reliable devices are under continuous development.

A common approach is to simultaneously use two or more detectors of different nature, for example a smoke detector and an infrared detector. However, even such a detector combination may sometimes give false information. In attempts to overcome such limitation there was invented an infrared detection device measuring not only infrared emission from the fire, but also a frequency of flame oscillations. This gives a clear signature of a fire and also improves the signal-to-noise ratio. There have also been attempts to combine IR and UV sensitive detectors. However, the UV detectors used are very expensive and of low sensitivity.

Nevertheless, there are a few drawbacks of such approaches. Firstly, such technique is complex and thus costly, the infrared detector needs for instance cooling. Furthermore, the power consumption of such an approach is rather high.

Infrared detectors as such have typically not very good signal-to-noise or signal-to-background ratios. Thus, there is a need of another detecting principle, which is simple and reliable.

SUMMARY OF THE INVENTION

Accordingly, it is an object of the present invention to provide a flame detector, which provides for high signal-to-noise and signal-to-background ratios to thereby obtain a reliable detection.

A further object of the invention is to provide such a flame detector, which provides for high sensitivity.

Still a further object of the invention is to provide such a flame detector, which provides for low power consumption.

Yet a further object of the present invention is to provide such a flame detector, which is effective, fast, accurate, reliable, and of low cost.

These objects among others are, according to the present invention, attained by flame detectors, automatic fire alarms, and methods related thereto as claimed in the appended claims.

By the provision of a gaseous-based detector provided with a photocathode as claimed in the appended claims for detection of flames and discharges a simple and cheap detector is obtained, which is also reliable and exhibits excellent detecting characteristics.

Further, the detector is insensible to visible light, has high output signals for simple signal processing, and it can be manufactured in large size, i.e. with large sensitive area (square meters) of extremely high sensitivity.

Further characteristics of the invention and advantages thereof will be evident from the detailed description of preferred embodiments of the present invention given hereinafter and the accompanying FIGS. 1–4, which are given by way of illustration only, and thus are not limitative of the present invention.

BRIEF DESCRIPTION OF THE DRAWINGS

FIG. 1a illustrates schematically, in a cross-sectional top view, a flame detector according to a first embodiment of the present invention, and FIGS. 1b and 1c illustrate other embodiments of the anode. FIG. 1d illustrates a lens or mirror according to an embodiment of the invention.

FIG. 2 illustrates schematically, in a perspective view, a flame detector according to a second embodiment of the present invention, wherein a top cover of the detector is removed for illustrative purposes.

DETAILED DESCRIPTION OF PREFERRED EMBODIMENTS

Figure 3:
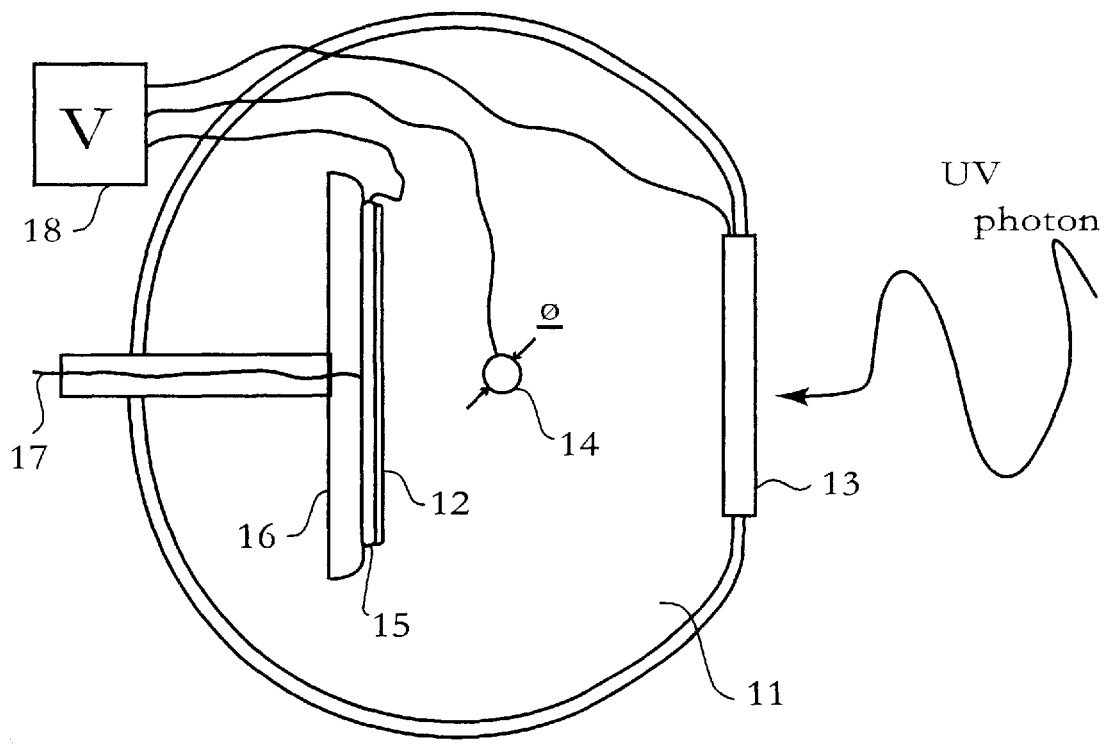
FIG. 3 illustrates schematically, in a cross-sectional top view, a flame detector according to a third embodiment of the present invention.

With reference now to FIG. 1 a first embodiment of a flame detector according to the present invention comprises a detection chamber 11, which is preferably gas tight and filled with a gas suitable for electron multiplication, e.g. methane, ethane, $CO_2$ or gas mixtures of e.g. argon-isobutane or argon-$CO_2$.

At the front side of chamber 11 there is arranged a UV photon sensitive photocathode 12 on a UV-transparent window 13 such that UV light from a flame (not illustrated) present in front of the detector can strike the UV sensitive photocathode and get absorbed. Most flames in air have very strong molecular band emission in the wavelength range of 150–280 nm (CH and OH), which can be used for clear fire identification. Also electrical discharges in air have strong emission lines in the wavelength region 150–280 nm.

The photocathode used should preferably have a wavelength dependent quantum efficiency, which makes it only sensitive to UV and VUV light. Typically the photocathode should only be sensitive to wavelengths shorter than 300 nm, or even more preferably to wavelengths shorter than 240 nm. In this way no bandpass filter is needed in front of the detector. Of course, a photocathode material, which is sensitive to longer wavelengths, could be used in combination with a bandpass filter in front of the detector that only transmits UV light.

The photocathode 12 is preferably disc-shaped with a diameter D and arranged together with window 13 to constitute an integrated part of the walls of chamber 11. Suitable photocathode materials are CuI, CsTe and CsI as the quantum efficiency of CuI, CsTe and CsI overlaps well with the flame emission spectra. At the same time such detectors are practically insensitive to visible light. Further, the photocathode shall be thin such that photoelectrons can be emitted from a surface opposite to the surface facing the UV light, i.e. within chamber 11. Thus the photocathode 12 may be provided as a thin to very thin layer on the entrance window 13. The photocathode can alternatively be a gaseous or liquid material.

A gaseous photocathode is realized by removing the thin photocathode layer 12 and mixing the gas suitable for electron multiplication in chamber 11 with a gas suitable to be used as a photocathode material, e.g. gaseous TMAE, TEA or etylferrocene. Thus electrons may be released anywhere within chamber 11.

A liquid photocathode is realized in a similar manner by removing the thin photocathode layer 12 and filling a bottom portion of chamber 11 with a liquid suitable to be used as a photocathode material, e.g. liquid TMA, TMAE, TEA or etylferrocene. In yet an alternative version the gas suitable for avalanche amplification in chamber 11 is removed and the complete chamber 11 is filled with a liquid or a mixture of liquids, e.g. the above mentioned optionally together with a liquid suitable for avalanche amplification. However, such a detector would not be very sensitive since no or only poor avalanche amplification will occur.

An anode in the form of a single wire 14 of a diameter Ø is arranged parallel to, and at a distance d behind, the UV sensitive photocathode 12. The anode wire diameter Ø shall preferably be larger than 0.01 mm, more preferably larger than 0.1, even more preferably between 0.1 and 3 mm, and most preferably between 0.3 and 1 mm. The inter-electrode distance d shall preferably be less than the diameter D of the photocathode 12.

Further, there is arranged a readout arrangement 15–17 close to the anode wire 14 in chamber 11, the readout arrangement including a readout element 15 possibly supported by a dielectric support structure 16 and a signal connection 17 connecting the readout element 15 to the exterior of chamber 11. The readout arrangement 15–17 could also be a single conducting element.

A voltage supply unit 18 is connected to the photocathode 12, to the anode wire 14, and to the readout element 15 as schematically indicated in FIG. 1, such that an electric field is created between the photocathode 12 and the anode 14 and a concentrated electric field is created close to and around the anode wire 14. The voltage supply unit may be powered by a portable battery.

When UV photons from the flame hit the UV sensitive photocathode 12, electrons will be released, which will be accelerated in the electric field and move towards the anode wire and by interaction with the gas in chamber 11 optionally cause avalanche amplification. Three modes of operation of such a detector can be distinguished: proportional, Geiger and streamer modes. The detector operates in proportional mode when a weak electric field between the cathode and the anode (particularly close to the anode) is applied, in Geiger mode when the electric field is increased, and in streamer mode at very high electric fields. The voltages needed are depending on the geometry used and the distance d and may be several hundred volts or more, but typically very low currents are flowing.

In the proportional mode all processes in the gaseous detector terminate when the ions from the primary avalanche have been collected at the electrodes. A flame detector according to the present invention, operating in the proportional mode, may have very high gain up to $10^5$ or higher and good time resolution, e.g. below a nanosecond. Furthermore, the detector has a wide dynamic range allowing it to measure the UV-light intensity over a wide range of intensities.

In the Geiger and streamer modes the primary avalanche may trigger a sequence of secondary avalanches. As a result, in these modes, the output signal from the detector is usually larger than a few volts. The time resolution in this mode is typically 0.1–1 $\mu$s.

At very low voltages no avalanche multiplication will be obtained, but, nevertheless, there may be applications where the number electrons released from the photocathode will be sufficient for detection.

The detector design, i.e. the choices of the diameter Ø of the anode wire and the inter-electrode distance d, are important as they strongly affect the quantum efficiency of the photocathode.

The output of the readout arrangement 15–17 may be further connected to processing and/or decision circuitry (not illustrated) to process the signal further.

It shall be appreciated that the readout element 15 may be dispensed with and that the readout may be performed directly at the anode wire 14.

It shall further be appreciated that other electrodes, e.g. mesh electrodes, may be used to divide chamber 11 into different drift and avalanche amplification regions.

It shall still further be appreciated that instead of a single wire anode 14, a multiwire anode arrangement 114 or planar anode, e.g., including an array of anode elements 214 may be employed. In fact, any type of micropattern or electric field focusing geometry is applicable.

In such an instance a lens or mirror 300 may be arranged in front of the detector to image a flame in front of the detector onto the UV sensitive photo cathode 12, and the readout arrangement may be adapted to detect charges induced by electrons moving towards each anode wire or element separately, and to convert these separately detected charges into a readout signal indicative of the image of the flame in front of the detector on the UV sensitive photocathode. Hereby, two-dimensional imaging of a flame (or at least of the UV light emitted in the flame) may be performed.

Further, the readout arrangement may be adapted to detect charges induced by the moving electrons temporally resolved to thereby detect temporal properties of the flame in front of the detector, particularly a frequency of flame oscillations of the flame in front of the detector, to increase the reliability of the detector.

A position-sensitive detector of the present invention can further be used in various technical fields, such as, e.g., for monitoring of flames, e.g., oil pipe flames and rocket launches, but also to detect electrical coronas or discharges on high voltage units, and to detect lightning during daytime as an early warning or for triggering fast switch-off of equipment.

With reference next to FIG. 2 a second embodiment of the flame detector of the present invention comprises a cylindrical UV sensitive photocathode 21 and an anode wire 22 arranged symmetrically within the photocathode 21. A voltage supply unit 23 is connected to the photocathode 21 and the anode wire 22 to obtain a suitable electric field. Further, a readout arrangement 24 is connected to the anode wire 22 to detect charges induced therein. The cylindrical photocathode defines the sidewalls of a chamber 25. A top cover (not illustrated) and a bottom cover 26 encloses the chamber 25, preferably in a gas-tight manner, and chamber 25 is filled with a gas or gas mixture suitable for avalanche amplification of electrons.

By such detector design a 360° view angle is achieved and thus a flame in virtually any direction may be detected.

It shall be appreciated that the cylindrical photocathode 21 may be covered by a bandpass filter (not illustrated) with a narrow pass band as was discussed in connection with the FIG. 1 embodiment.

It shall further be appreciated that if a cylindrical shape is difficult or costly to manufacture a similar operation will be achieved if three or more planar photocathodes (not illustrated) are arranged around the anode wire to cover all or most directions in the horizontal plane. In fact, practically any geometry where the UV-light impinges on the photocathode and the emitted electrons move towards the anode is possible.

It shall still further be appreciated that a multi-element anode (not illustrated) may be used with this large view angle embodiment. For instance, a plurality of anode wires, strips or other pattern geometry may be arranged on a dielectric support with a photocathode arrangement, and if individual readout of the wires are performed not only presence of a flame may be detected, but also in which direction from the detector the flame exists. This effect can be made more efficient by dividing the volume 25 into optically segmented volumes using optical blinds between the anode wires.

With reference next to FIG. 3 a third embodiment of the flame detector of the present invention is identical with the first embodiment except for the location of the photocathode 12. Here the thin photocathode layer 12 is provided on the readout element 15 of the readout arrangement 15–17, and only window 13 is arranged at the front of the detector, where window 13 is made of e.g. quartz or $MgF_2$ and is possibly provided with a UV band pass filter (not illustrated). Window 13 and readout element 15/photocathode 12 are adapted to operate as cathodes in the detector and are thus, together with the anode wire 14, connected to the voltage supply unit 18.

In an alternative version, the anode wire 14 can be dispensed with, and thus the voltages are applied such that window 13 operates as anode in the detector.

Figure 4:
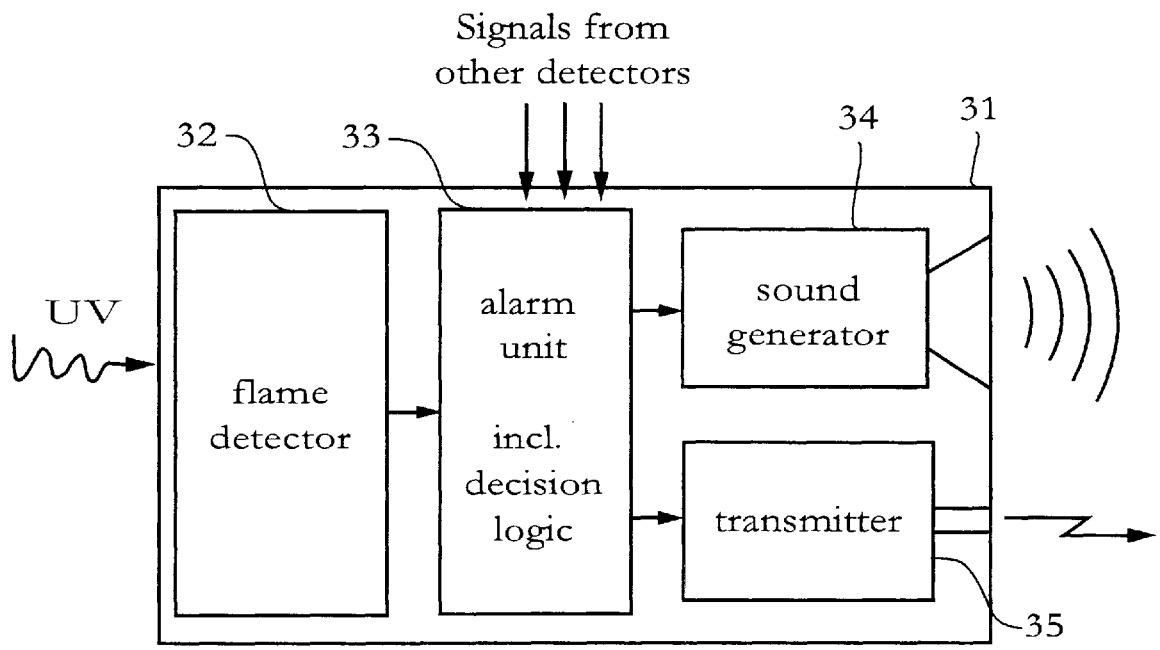
FIG. 4 illustrates schematically, in a block diagram, an automatic fire alarm according to the present invention, where the fire alarm includes any one of the flame detectors of FIGS. 1–3.

With reference finally to FIG. 4 an automatic fire alarm 31 of the present invention comprises a flame detector 32 and an alarm unit 33 connected to the detector 32. The detector 32 is the flame detector of any of the first, second, or third embodiments of the present invention and is thus adapted to detect the presence of a flame in front of the detector. The alarm unit is adapted to generate a fire alarm signal in response to a detected presence of a flame in front of the detector 32.

Optionally the UV detector can be used in combination with one or several other detector types, e.g. IR and smoke detectors where the logic in the alarm unit 33 decides whether there is an alarm or not based on the different signals from these detectors.

Further, the alarm unit includes a sound generator 34 and a transmitter 35, each connected to the alarm unit 31. The sound generator 34 is adapted to generate a sound in response to the fire alarm signal to alert the environment of the presence of a nearby flame. The transmitter 35 adapted to transmit (through a wire or wireless) the fire alarm signal to a remotely located site, e.g. an emergency service center.

Several UV detectors can also be placed at different positions, all facing the same point. In this way a 3-D reconstruction of the possible flame is possible which can be used by the logic in the alarm unit to further discriminate false alarms.

Advantages of the flame detector and the automatic fire alarm of the present invention include:

Low cost.

Low power consumption, and thus batteries can be used as voltage supply.

High sensitivity for flame radiation.

The detector is practically insensitive to visible light.

No UV transmitting filter is needed.

High output signals. When operated in Geiger mode, for example, the amplitude of the output signal is up to few volts, and thus no additional amplifier is needed to process the signal.

The inventive detector has practically no noise pulses.

High signal-to-noise and signal-to-background ratios.

No cooling is needed.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A flame detector for detecting the presence of a flame or spark in front of the detector, comprising:
   a UV sensitive photocathode and an anode, wherein the UV sensitive photocathode is oriented such that UV-light from a flame or spark present in front of the detector can strike the UV sensitive photocathode;
   a voltage supply unit connected to the UV sensitive photocathode and to the anode to create an electric field such that photoelectrons emitted from the UV sensitive photocathode, when struck by UV-light from a flame or spark present in front of the detector, are forced to move towards the anode;
   a readout arrangement adapted to detect charges induced by electrons moving towards the anode and which are indicative of the presence of a flame or spark in front of the detector; and
   a chamber filled with a gas and arranged such that photoelectrons emitted from the UV sensitive photocathode can interact with the gas when moving towards the anode, wherein the detector is adapted to avalanche multiply photoelectrons emitted from the UV sensitive photocathode.

2. The detector as claimed in claim 1, wherein the UV sensitive photocathode and the anode are arranged substantially parallel with each other.

3. The detector as claimed in claim 2, wherein the anode is a single wire arrangement.

4. The detector as claimed in claim 3, wherein the UV sensitive photocathode is cylindrical and arranged substantially symmetrically around the single wire anode.

5. The detector as claimed in claim 3, wherein the UV sensitive photocathode is substantially planar.

6. The detector as claimed in claim 3, wherein the diameter of the single wire anode is larger than 0.01 mm.

7. The detector as claimed in claim 6, wherein the distance between the UV sensitive photocathode and the single wire anode is less than a photocathode diameter D.

8. The detector as claimed in claim 3, wherein the diameter of the single wire anode is larger than 0.1 mm.

9. The detector as claimed in claim 3, wherein the diameter of the single wire anode is between 0.1 and 3 mm.

10. The detector as claimed in claim 3, wherein the diameter of the single wire anode is between 0.3 and 1 mm.

11. The detector as claimed in claim 2, wherein the anode is a multiwire arrangement.

12. The detector as claimed in claim 11, further comprising a lens or focusing mirror in front of the detector to image a flame or spark in front of the detector onto the UV sensitive photocathode, and wherein the readout arrangement is adapted to separately detect charges induced by electrons, and to convert these separately detected charges into a readout signal indicative of the image of the flame or spark in front of the detector on the UV sensitive photocathode.

13. The detector as claimed in claim 12, wherein the readout arrangement is adapted to detect charges induced by the moving electrons temporally resolved to thereby detect temporal properties of a flame or spark in front of the detector.

14. The detector as claimed in claim 12, wherein the readout arrangement is adapted to detect charges induced by the moving electrons temporally resolved to thereby detect a frequency of flame oscillations of a flame in front of the detector.

15. The detector as claimed in claim 2, wherein the anode is planar and includes an array of anode elements.

16. The detector as claimed in claim 1, wherein the detector is adapted to operate in any of proportional, Geiger or streamer modes.

17. The detector as claimed in claim 1, wherein the UV sensitive photocathode consists of at least a solid, a liquid or a gas.

18. An automatic fire or spark alarm comprising at least one detector for detecting the presence of a flame or spark in front of the detector and an alarm unit adapted to generate an alarm signal in response to a detected presence of a flame or spark in front of the detector, wherein the detector is the detector as claimed in claim 1.

19. The automatic alarm as claimed in claim 18, wherein the alarm unit includes a sound generator adapted to generate a sound in response to said alarm signal.

20. The automatic alarm as claimed in claim 18, wherein the alarm unit includes a transmitter adapted to transmit the alarm signal to a remotely located site.

21. The automatic alarm as claimed in claim 18, wherein said alarm unit is adapted to generate an alarm signal in response to a detected flame, spark or smoke by said at least one detector.

22. A method for detecting the presence of a flame or spark, comprising the steps of:

arranging a UV sensitive photocathode such that UV light from a flame or spark can strike the UV sensitive photocathode;

applying a voltage between said UV sensitive photocathode and an anode such that photoelectrons emitted from the UV sensitive photocathode, when struck by UV light from a flame or spark, are forced to move towards the anode;

detecting charges induced by electrons moving towards the anode to thereby detect the presence of a flame or spark;

arranging a chamber filled with a gas such that photoelectrons emitted from the UV sensitive photocathode can interact with the gas when moving towards the anode; and adapting a detector to avalanche multiply photoelectrons emitted from the UV sensitive photocathode.

23. A method for automatic fire or spark alarming comprising the steps of detecting the presence of a flame or spark and generating a fire alarm signal in response to the detected presence of a flame, wherein the flame or spark is detected as claimed in claim 22.

* * * * *